(12) United States Patent
Craft et al.

(10) Patent No.: US 8,495,573 B2
(45) Date of Patent: Jul. 23, 2013

(54) CHECKPOINT AND RESTARTABLE APPLICATIONS AND SYSTEM SERVICES

(75) Inventors: David Jones Craft, Wimberley, TX (US); Vinit Jain, Austin, TX (US); Lance Warren Russell, Rosanky, TX (US)

(73) Assignee: International Business Machines Corporation, Armonk, NY (US)

( * ) Notice: Subject to any disclaimer, the term of this patent is extended or adjusted under 35 U.S.C. 154(b) by 1692 days.

(21) Appl. No.: 11/867,303

(22) Filed: Oct. 4, 2007

(65) Prior Publication Data

US 2009/0094582 A1   Apr. 9, 2009

(51) Int. Cl.
*G06F 9/44* (2006.01)
(52) U.S. Cl.
USPC .......................... 717/124; 717/129
(58) Field of Classification Search
USPC .................. 717/124, 129
See application file for complete search history.

(56) References Cited

U.S. PATENT DOCUMENTS 6,247,109 B1 * 6/2001 Kleinsorge et al. ............ 712/13
2004/0111720 A1 * 6/2004 Vertes ........................... 717/164

FOREIGN PATENT DOCUMENTS

FR    2872605 A1    6/2006

OTHER PUBLICATIONS

U.S. Appl. No. 11/867,126, filed Oct. 4, 2007.
U.S. Appl. No. 11/867,101, filed Oct. 4, 2007.
Peckham, "User Space Loader", IBM Research Disclosure, vol. 42, No. 418, Feb. 1999, pp. 1-3.
Bull, "Transparent Dynamic Subroutine Loader", IBM Technical Disclosure Bulleting, May 1986, pp. 5535-5537.
"IRIX 6.4 cpr (1)", SGI, pp. 1-6, retrieved May 10, 2007. http://techpubs.sgi.com/library/tpl/cgi-bin/gtecdoc.cgi?coll=0640&db=man&fname=/usr/share/caman/u_man/cat1/cpr.z.

* cited by examiner

*Primary Examiner* — Qamrun Nahar
(74) *Attorney, Agent, or Firm* — Yee & Associates, P.C.; David A. Mims, Jr.

(57) ABSTRACT

A computer implemented method, apparatus, and computer program product for checkpoint and restart of a process. In one embodiment, a process shell representing a restartable process is created on an arrival server in response to identifying a process on a departure server that is a restartable process. The process shell is frozen. A name of the restartable process, an identifier of the restartable process, and an identifier of a parent process of the restartable process is assigned to the process shell. The process shell is then unfrozen and exits. A parent process restarts the restartable process when the process shell exits.

20 Claims, 4 Drawing Sheets

CHECKPOINT AND RESTARTABLE APPLICATIONS AND SYSTEM SERVICES

BACKGROUND OF THE INVENTION

1. Field of the Invention

The present invention is related generally to a data processing system and in particular to a method and apparatus for the migration of a software partition. More particularly, the present invention is directed to a computer implemented method, apparatus, and computer usable program code for restarting a process with minimal checkpoint data for the process.

2. Description of the Related Art

In a software partitioned environment, a single instance of the operating system can be partitioned into multiple virtual operating system environments. Each of these virtual operating system environments is known as a software partition. A software partition is a virtualized operating system environment within a single instance of the operating system. An example of a software partition is AIX® workload partition (WPAR), which is a product available from International Business Machines (IBM®) Corporation.

Software running within each software partition will appear to have its own separate instance of the operating system. A software partition may include one or more processes. Processes in a software partition are completely isolated from processes in other software partitions in the same system. They are not allowed to interact with processes in other software partitions in the same system.

A software partition, including any processes running in the partition, may be migrated from one physical computing device to another physical computing device, while processes are still running in the software partition. Migration of a software partition involves checkpointing the state of every process in the partition on one data processing system and then restoring the state of every process on another data processing system using the checkpoint data.

However, checkpoint of application and system state is both a compute and data intensive task. As such, the amount of work needed for each application is highly dependent on the memory footprint and system data currently in use by the application at checkpoint time. The memory footprint is the amount of main memory space plus other memory required by a process during execution of the process. The size of the memory footprint depends on the size of the program that is executing. The larger the program, typically, the larger the memory footprint associated with the program. Moreover, the larger the memory footprint associated with the process that is being checkpointed, the more time is required to checkpoint and restart the process.

SUMMARY OF THE INVENTION

The illustrative embodiments provide a computer implemented method, apparatus, and computer usable program code for a checkpoint and restart of a process. In one embodiment, a process shell representing a restartable process is created on an arrival server in response to identifying a process on a departure server that is a restartable process. The process shell is frozen. A name of the restartable process, an identifier of the restartable process, and an identifier of a parent process of the restartable process is assigned to the process shell. The process shell is then unfrozen and exits. A parent process restarts the restartable process when the process shell exits.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
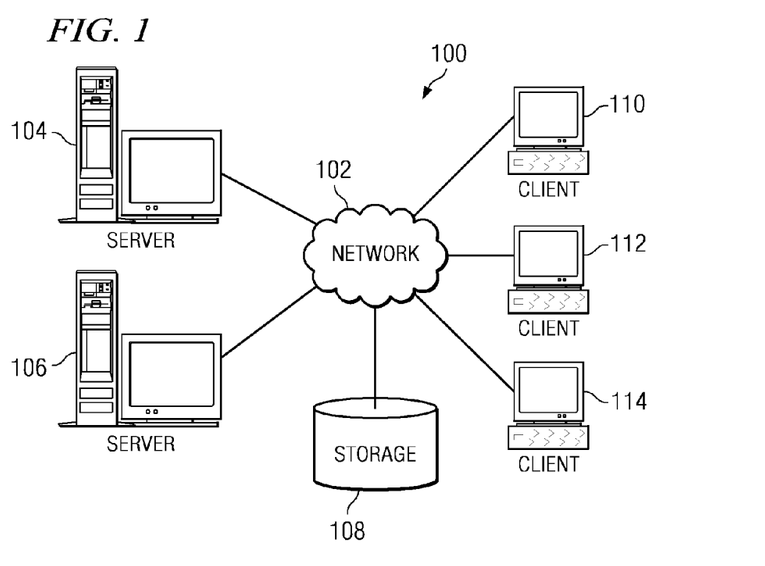
FIG. 1 is a pictorial representation of a network of data processing systems in which illustrative embodiments may be implemented.
Figure 2:
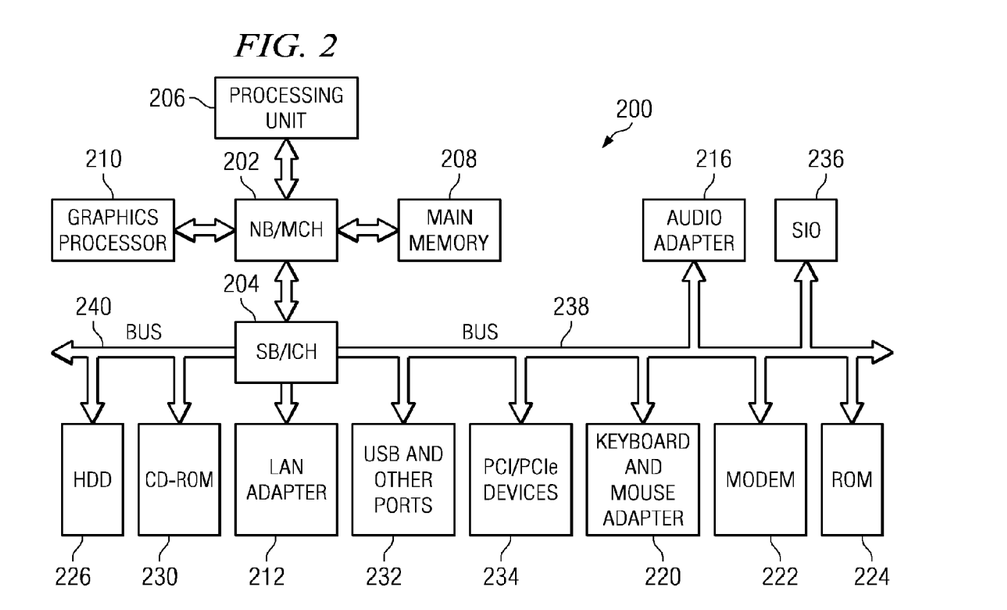
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In this example, server 104 and server 108 support a software partitioned environment.

In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 may also include software partitions. Clients 110, 112, and 114 are clients to server 104 in this example. Network data processing system 100 may include additional servers, clients, and other devices not shown.

In this example, server 104 supports a workload partition having one or more applications running in the workload partition. The workload partition is being migrated to client 110. In one embodiment, prior to migration of the workload partition, a checkpoint process initiates the gathering and saving of checkpoint data regarding the state of all applications running in the workload partition that is being migrated. The checkpoint data is saved to state files on any type of storage device, such as storage unit 108.

However, in another embodiment, checkpoint data is not saved to state files on storage 108. Instead, a departure server, such as server 104, transmits the checkpoint data directly to an arrival server, such as server 106. An arrival server is the server onto which the migrating workload partition is moved. In other words, during migration of a workload partition, the workload partition is migrated or moved from a departure server to an arrival server. In this case, the checkpoint data is never saved on storage unit 108 and/or is saved on storage unit 108 after or in conjunction with transmitting the checkpoint data to server 106.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments. Data processing system 200 supports a software partitioned environment that includes one or more software partitions.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

A software partition is a virtualized operating system environment within a single instance of the operating system. A single instance of the operating system can be partitioned into multiple virtual operating system environments. Each of these virtual operating system environments is known as a software partition. An example of a software partition is AIX® workload partition (WPAR), which is a product available from International Business Machines (IBM®) Corporation.

Software running within each software partition will appear to have its own separate instance of the operating system. A software partition may include one or more processes. Processes in one software partition are completely isolated from processes in other software partitions on the same data processing system. They are not allowed to interact with processes in other software partitions.

A software partition, including any processes running in the partition, may be migrated from one physical computing device to another physical computing device while still active. The processes and/or other content of a software partition may also be migrated into another software partition on the same physical computing device.

Migration of a software partition involves checkpointing the state of every process in the partition on a first data processing system and then restoring the state of every process on a second partition using the checkpoint data. As used herein, the second partition may be a different partition located on the first data processing system or a different partition located on a different data processing system than the first data processing system.

A checkpoint operation is a data integrity operation in which the application state and memory contents for an application are written to stable storage at a particular time to provide a basis upon which to recreate the state of an application and/or processes running in a software partition, such as when a software partition is migrated from one physical computing device to another physical computing device. The process by which the state and memory contents are written to stable storage may be referred to as a checkpoint.

When a software partition is migrated to a different machine, a checkpoint operation is performed to obtain and store information regarding applications and/or processes running in the software partition. The state data may be saved into a state file on a local data storage device or on a remote data storage device, such as, but not limited to, a local hard disk, a network disk, a flash memory, a tape drive, a nonvolatile random access memory (NVRAM), or any other type of data storage device. Checkpoint operations are performed at various pre-defined points in time to generate checkpoint data. The checkpoint data is utilized during a software partition migration operation to move a software partition onto a different physical computing device and/or into a different software partition on the same physical computing device using the checkpoint data to recreate/restore the state of all processes running in the software partition at the last checkpoint into a new software partition.

The process of saving checkpoint data for an application and system state is both a compute and data intensive task. As such, the amount of work needed for each application is highly dependent on the memory footprint and system data currently in use by the application at checkpoint time. The memory footprint is the amount of main memory space plus other memory required by a process during execution of the process. The size of the memory footprint depends on the size of the program that is executing. The larger the program, typically, the larger the memory footprint associated with the program. Moreover, the larger the memory footprint associated with the process that is being checkpointed, the more time is required to checkpoint and restart the process.

The illustrative embodiments recognize that it is highly conducive and beneficial to lessen the amount of work needed to gather checkpoint data for a process and then restart the process. Therefore, the illustrative embodiments provide a process to directly lessen checkpoint work but still record sufficient data to allow proper recreation of an application or system server.

The illustrative embodiments provide a computer implemented method, apparatus, and computer usable program code for a checkpoint and restart of a process. In one embodiment, a process shell representing a restartable process is created on an arrival server in response to identifying a process on a departure server that is a restartable process.

As used herein, the term "process shell" refers to a process that is only a shell of its former self. In other words, a process shell refers to a process that appears outwardly to be the same as it was before the process required restart. The process identifier and parent process identifier, such as process id/parent/, are the same. However, internally, the process is a hollowed out form of itself that lacks the executable code and other internal data for performing the functions that are ordinarily performed by the process.

The process shell is frozen. A name of the restartable process, an identifier of the restartable process, and an identifier of a parent process of the restartable process is assigned to the process shell. The shell process is then unfrozen and exits. A parent process restarts the restartable process when the process shell exits.

Many services, such as, without limitation, email services, program the parent process to restart a dead or dying child process so that the child process can resume functioning at the point where the child process died without disrupting service to the customer. Parents of these restartable child processes are programmed to recognize the death of the child. The parent process typically recognizes the death of a child when the parent receives a "SIGCLD" signal. The parent process then restarts the process. The previously dead child process is then able to resume executing or performing operations at the point where the child process experienced the event that resulted in the death of the child process.

Figure 3:
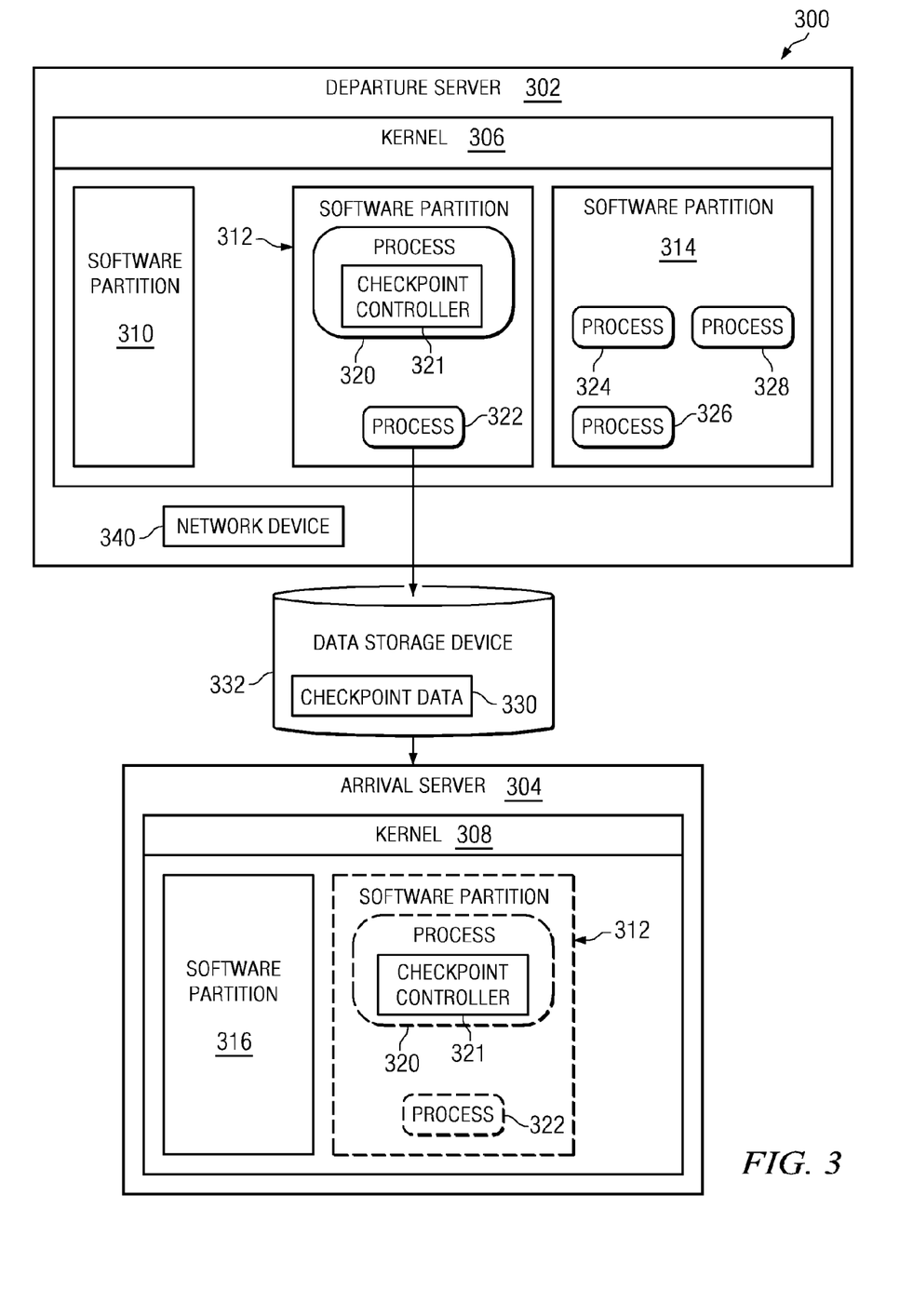
FIG. 3 is a block diagram illustrating the checkpoint process during the migration of a software partition in accordance with an illustrative embodiment.

FIG. 3 is a block diagram illustrating a checkpoint procedure during the migration of a software partition in accordance with an illustrative embodiment. Data processing system 300 may be implemented in any type of network data processing system, including, without limitation, data processing system 100 in FIG. 1.

Departure server 302 and arrival server 304 are computing devices that support a software partitioned environment. Departure server 302 is the server on which the software partition is located before migration. Arrival server 304 is the server on which the software partition is located after migration. When a software partition is migrated, it "departs" from departure server 302 and "arrives" on arrival server 304.

The software partition on departure server 302 may be referred to as a first software partition or a departure software partition. The software partition on arrival server 304 after migration of the software partition to arrival server 304 may be referred to as a second software partition or an arrival software partition. Departure server 302 and arrival server 304 may be implemented in any type of computing device supporting a software partitioned environment, such as, but not limited to, server 104 or client 110 in FIG. 1. For example, departure server 302 may be, but is not limited to, a Websphere server or an Apache web server.

Kernel 306 and kernel 308 are software processes for managing resources on data processing system 300, such as, without limitation, processor resources, input and output (I/O) resources, and memory resources on a computing device. In other words, kernel 306 is an abstraction layer between hardware and software on departure server 302 and kernel 308 is an abstraction layer between hardware and software on departure server 302.

Departure server 302 includes one or more software partitions for partitioning the operating system image within kernel 306 into multiple virtual operating system instances. In this example, departure server 302 includes software partitions 310-314. Arrival server 304 includes software partition 316. However, a server, such as departure server 302, is not limited to three software partitions. In accordance with the illustrative embodiments, a computing device, such as departure server 302 or arrival server 304, may include two software partitions, four software partitions, or any other number of software partitions in accordance with the illustrative embodiments.

Each software partition may include one or more processes. A process is an executing instance of a computer program or application, a task, or an operation being performed on data. In other words, a process executes the instructions in a computer program. A process may include any type of application or process running in a software partition. In this example, software partition 312 includes processes 320-322 and software partition 314 includes processes 324-328.

Software partition 312 is being migrated from departure server 302 to arrival server 304. A checkpoint controller is associated with each process running on software partition 312. A checkpoint controller is a software component of a given process that gathers process state data, data regarding open files and open sockets bound to the process, the state of streams associated with the process, the state of in-flight files associated with the process, and any other information regarding the current state of a process in software partition 312. The checkpoint data may then be used to recreate or re-establish each process running in software partition 312 to the same state that existed at the time the checkpoint controller gathered the checkpoint data. The time a checkpoint controller gathers checkpoint data is referred to as a checkpoint time.

For example, checkpoint controller 321 associated with process 320 saves state data for process 320. Another checkpoint controller (not shown) associated with process 322 saves state data associated with process 322 to a state file. The state data for processes 320-322 form checkpoint data 330. Checkpoint data 330 is utilized to restore or restart processes 320-322 on arrival server 304 in the same state that processes 320-322 were in on departure server 302 at the time checkpoint data 330 was last saved.

Checkpoint data 330 is a set of state files on data storage device 332 for storing state data regarding processes running on a software partition. The state of each process in a software partition can be stored in one state file. In this example, if a software partition had ten processes running on the software partition, checkpoint data 330 would contain ten state files. Checkpoint data 330 stores checkpoint state data for processes 320-322 running in software partition 312 to state files on data storage device 332 to form checkpoint data 330. In this example, checkpoint data 330 stores state information for software partition 312. However, checkpoint data 330 may include state files for multiple software partitions, rather than only a single software partition.

Checkpoint data 330 is stored in data storage device 332. Data storage device 332 is any type of known or available device for storing data, including, without limitation, a hard disk, a compact disk (CD), a compact disk rewrite-able (CD-RW), a compact disk read-only memory, a non-volatile random access memory (NV-RAM), a flash memory, or any other type of data storage device. Data storage device 332 may be located locally to departure server 302, locally to arrival server 304, remotely to departure server 302, and/or remotely to arrival server 304.

In this example, data storage device 332 is located remotely to departure server 302. In other words, data storage device 332 is implemented using one or more network data storage devices that are accessible to departure server 302 and/or arrival server 304 via a network connection, such as network 102 in FIG. 1. For example, data storage device 332 may include one or more remote data storage devices, such as storage unit 108 in FIG. 1. A network connection may be enabled via a network device associated with departure server 302 and/or arrival server 304.

A network device (not shown) is any type of known or available network access software for allowing a computing device to access a network. The network device connects to a network connection. The network connection permits access to any type of network. For example, a network may include, but is not limited to, a local area network (LAN), a wide area network (WAN), the Internet, an intranet, an Ethernet, a wireless network, or any other type of network.

In another embodiment, data storage device 332 is located locally to departure server 302. Data stored in data storage device 332 is shared or made accessible to arrival server 304 using protocols, such as file transfer protocols (FTP), and/or any other protocols for accessing data in a remote data storage device.

In this example, data storage device 332 is a single data storage device. However, in accordance with the illustrative embodiments, data storage device 332 may include two or more data storage devices. For example, data storage device 332 may include, but is not limited to, any combination of a local hard disk, a local non-volatile random access memory, and/or a remote hard disk that is accessible to arrival server 304 over a network connection.

Figure 4:
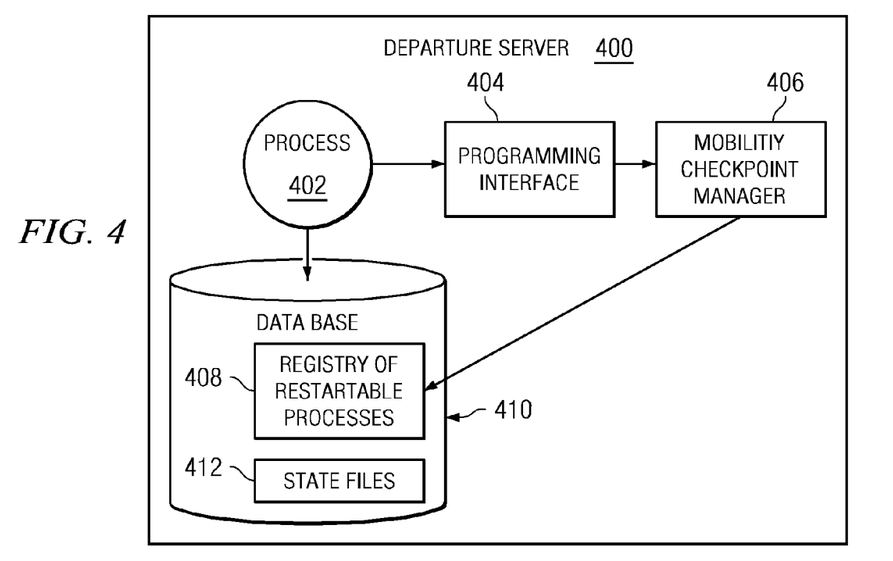
FIG. 4 is a block diagram illustrating a data flow through a departure server during a checkpoint process in accordance with an illustrative embodiment.

FIG. 4 is a block diagram illustrating a data flow through a departure server during a checkpoint process in accordance with an illustrative embodiment. Departure server 400 may be implemented in any type of computing device, including, but not limited to, any computing device described in FIGS. 1-3. In this example, departure server 400 is a server, such as, departure server 302 in FIG. 3.

Process 402 is an application or system service that is executing in a software partition, such as, without limitation, process 320 in software partition 312 in FIG. 3. Process 402 is a system service designed and implemented in a manner that allows process 402 to restart correctly in the event of an abrupt stop. For example, system services such as, without limitation, sendmail, cron, inetd, and other system services are designed in this manner so that the system service can automatically re-spawn in the event of an unexpected exit. The term re-spawn refers to restarting or recreating the process to its original or prior state.

Sendmail is a flexible and robust mail transfer agent (MTF). The system service inetd is a daemon that manages internet services. Cron is a scheduling service that schedules execution of other processes based on time. For example, a user can utilize cron to specify that a particular process should be run at midnight.

These applications and system services utilize child processes that can be automatically re-spawned and restarted by a parent process if the child process exits unexpectedly. A child process is a process created by another process, referred to as a parent process. The child process inherits its attributes from the parent process. For example, in Unix, every process, except process 0, has a parent process. A parent process can have multiple child processes.

When the child process terminates execution by calling exit, causing a fatal execution error, or unexpectedly failing, the parent process is informed of the child's exit status. The parent process can then re-spawn the child process back to the point where the child process exited without using checkpoint data. These processes that can be restarted by a parent process after the child process unexpectedly exits are referred to herein as restartable processes.

For example, and without limitation, sendmail is a restartable process. When sendmail transfers email messages through dozens of different servers and machines, if a machine in the chain of servers fails while an email message associated with a sendmail process is waiting on a queue on that machine, the sendmail parent process can detect the unexpected exit or failure of the child process and automatically re-spawn the child process on the machine. The re-spawned process then restarts and continues sending the email message without using any checkpoint data. In other words, the child process picks up where it left off prior to the unexpected exit.

Programming interface 404 is an application programming interface (API) that allows process 402 to specify to mobility checkpoint manager 406 that the appropriate checkpoint behavior for process 402 is to not gather checkpoint data for process 402.

Mobility checkpoint manager 406 is a software controller for managing migration of processes on one software partition to another software partition. Mobility checkpoint manager 406 manages the gathered and saving of checkpoint data during the checkpoint procedure. Mobility checkpoint manager 406 also manages the restart of processes that are being restarted after a checkpoint.

Process 402 uses programming interface 404 to identify process 402 as a restartable process. A restartable process is a process that is to exit immediately on restart. During checkpoint, internal application or system state data is not required, needed, gathered, or saved for restartable process.

In other words, normally, mobility checkpoint manager 406 gathers checkpoint data describing the state of every process and records every piece of checkpoint data for use in recreating each process on an arrival server, such as arrival server 304 in FIG. 3. But in this embodiment, process 402 calls programming interface 404 at checkpoint to specify to mobility checkpoint manager 406 that only minimal checkpoint data for process 402 should be gathered and saved. Minimal checkpoint data may also be referred to as nominal checkpoint data.

Mobility checkpoint manager 406 only saves the process identifier (ID) for process 402, the process identifier for the parent process of process 402, and the name of process 402. These simple attributes of process 402 are all that is required to restart process 402. The process identifier, parent identifier, and process name for process 402 are saved in database 410 in state files 412 with other checkpoint data associated with process 402 and other process in the software partition on departure server 400 that is being checkpointed.

Database 410 is implemented in any type of database or other data storage device, such as data storage device 332 in FIG. 3. State files 412 are files for storing checkpoint data, such as checkpoint data 330 in FIG. 3.

In another embodiment, mobility checkpoint manager 406 queries a registry of restartable processes 408 to determine which processes are restartable processes. In this example, process 402 adds an entry for process 402 to registry of restartable processes 408 to identify process 402 as a restartable process. During a checkpoint procedure, mobility checkpoint manager 406 checks registry of restartable processes 408 to identify restartable processes, such as process 402. If a process is listed in registry of restartable processes 408, mobility checkpoint manager 406 does not gather or record the normal checkpoint data for the process. Instead, mobility checkpoint manager only saves the process identifier, the parent process identifier, and the name of the process for each process listed in registry of restartable processes 408.

Thus, mobility checkpoint manager 406 only gathers minimal checkpoint data for processes and system services that are identifiable as restartable processes. In other words, mobility checkpoint manager 406 continues to collect and gather minimal checkpoint data such as the child process identifier, the parent process identifier, and the process name as checkpoint data. However, mobility checkpoint manager 406 does not gather any additional or more extensive checkpoint data for these restartable processes.

Figure 5:
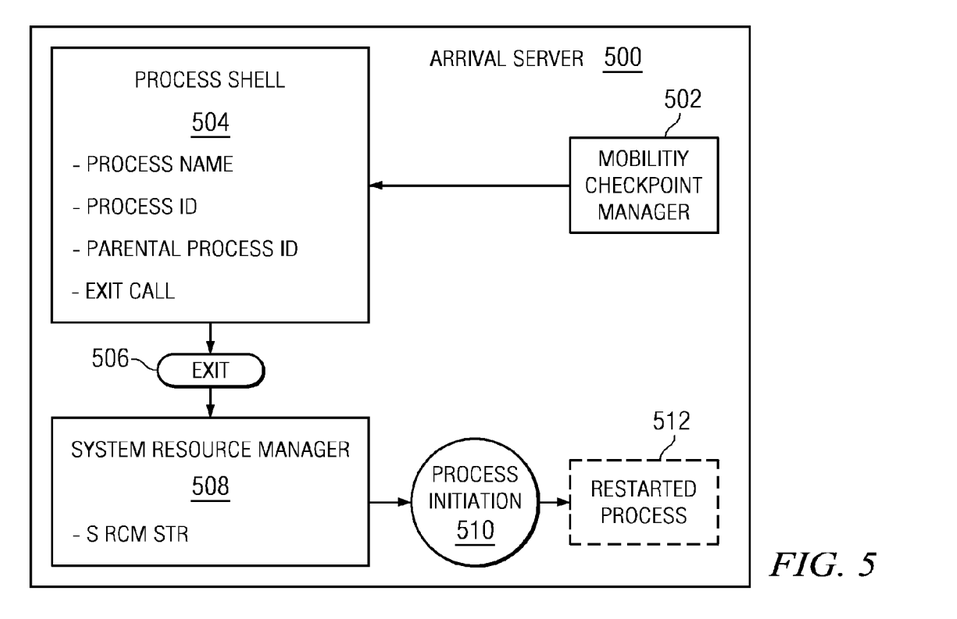
FIG. 5 is a block diagram illustrating a data flow through an arrival server during a restart process in accordance with an illustrative embodiment.

Referring now to FIG. 5, a block diagram illustrating a data flow through an arrival server during a restart process is depicted in accordance with an illustrative embodiment. Arrival server 500 may be implemented in any type of computing device, including, but not limited to, any computing device described in FIGS. 1-3. In this example, arrival server 500 is a server, such as, arrival server 304 in FIG. 3. Arrival server 500 may be a physical server or a logical server.

At restart, mobility checkpoint manager 502 creates a process shell for each restartable process. In this example, process shell 504 is a process shell for process 402 in FIG. 4. Process shell 504 is a simple frozen process at restart initiation. The term frozen refers to a process that is suspended. A frozen process cannot send or receive messages or signals or execute code. Process shell 504 is frozen until mobility checkpoint manager 502 finishes creating process shell 504.

Process shell 504 is a simple process that is a shell of its former self because it constitutes no internal state data that would be recognizable as equivalent to the internal data and state of process 402 on departure server 400 in FIG. 4. Process shell 504 does not contain any of the application text or executable code associated with the original process that is being restarted. Instead, process shell 504 is only assigned the appropriate process identifier and parent process identifier that are equivalent to the former self of process shell 504. Process shell 504 is also given a name that is equivalent to its former self.

In other words, process shell 504 is given the process identifier, parent process identifier, and name of process 402 in FIG. 4 that was saved during the checkpoint process. These simple attributes, which are viewable from outside the process, are sufficient for restart of process 402 on arrival server 500 using process shell 504. In addition, these simple attributes are significantly less than a complete process re-imaging and thus a significant amount of work has been avoided. In other words, a significantly less amount of data is gathered and saved for restarting the process than would otherwise be necessary for a process that is not a restartable process in accordance with the illustrative embodiments.

After mobility checkpoint manager 502 finishes creating process shell 504 and assigns the appropriate process name, process identifier, and parent process identifier to process shell 504. Process shell then performs a restart retext, just like any other restart process. The checkpoint/restart module exits. Thus, process shell 504 is programmed to exit during restart processing.

Mobility checkpoint manager 502 then releases process shell 504. Releasing process shell 504 refers to unfreezing process shell 504 such that process shell 504 is no longer in a suspended state. Once process shell 504 is unfrozen, process shell 504 is able to execute code, send messages, and receive messages. However, process shell 504 includes only the process identifier, the parent identifier, the process name, and an exit call function. Therefore, when process shell 504 is released, process shell 504 immediately calls exit 506.

The immediate process exit causes any controlling parent, for instance, without limitation, system resource manager (SRM) 508 to recognize an untimely death of the child process, process shell 504. The parent process recognizes that process shell 504 is a child process because of the process identifier and the parent process identifier included in process shell 504.

System resource manager 508 may be implemented as any type of parent process. System resource manager 508 initiates an immediate re-spawn of the process following exit 506 by calling process initiation 510. Process initiation 510 re-spawns process 402 in FIG. 4 and restarts the process to form restarted process 512. Thus, the behavior of an immediate exit and re-spawn is sufficient for many applications and system services to restart their prior work without noticeable interruption.

In addition, the specification of this behavior may be initiated by a programming interface call to mobility checkpoint manager 502 through a programming interface, such as programming interface 404 in FIG. 4 or by a prior registration of restartable programs in a checkpointing database, such as registry of restartable processes 408 in FIG. 4.

During checkpoint of a restartable process, the restartable process is frozen and then retext occurs. A checkpoint module is an independent code module that contains checkpointing code for performing a checkpoint operation. The checkpoint module is inserted into the restartable process and executed to perform the checkpoint of the restartable process. When the checkpoint module is inserted into the restartable process, the checkpoint module recognizes that the process is actually restartable and only requires collection of minimal checkpoint data. Thus, the checkpoint module only saves the minimal checkpoint data, which includes, the process identifier "pid," the parent process identifier "ppid," and the process name. The checkpoint module does not save any additional checkpoint data during the checkpoint operation at checkpoint time.

At restart time, the checkpoint/restart module realizes the process being restarted is a restartable process. The checkpoint/restart module does not have any substantive internal checkpoint data for the process. The checkpoint/restart module only has the process name, the process identifier, and the parent process identifier. Therefore, the checkpoint/restart module reincorporates this minimal checkpoint data into the process during restart and then exits.

Figure 6:
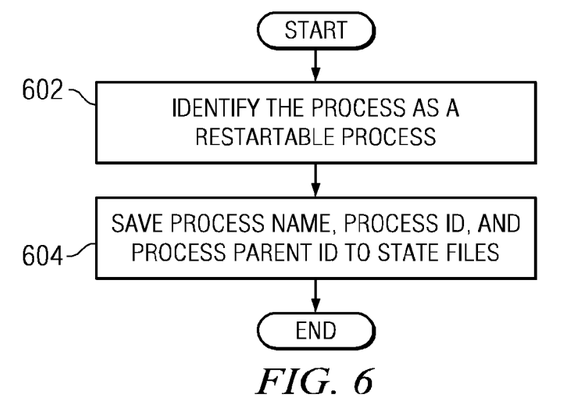
FIG. 6 is a flowchart illustrating a process for checkpointing a restartable process in accordance with an illustrative embodiment.

FIG. 6 is a flowchart illustrating a process for checkpointing a restartable process in accordance with an illustrative embodiment. The process in FIG. 6 may be implemented by software for managing the checkpoint and restart of processes in a software partitioned environment, such as mobility checkpoint manager 406 in FIG. 4 or mobility checkpoint manager 502 in FIG. 5. The mobility checkpoint manager is a checkpoint/restart module for checkpointing and restarting processes when the checkpoint/restart module is inserted or loaded into a process.

The mobility checkpoint manager identifies the process as a restartable processes that can be restarted on an arrival server using a process shell (step 602). The process saves a process name, a process identifier, and a parent process identifier for the process to state files (step 604) to form checkpoint data with the process terminating thereafter.

Figure 7:
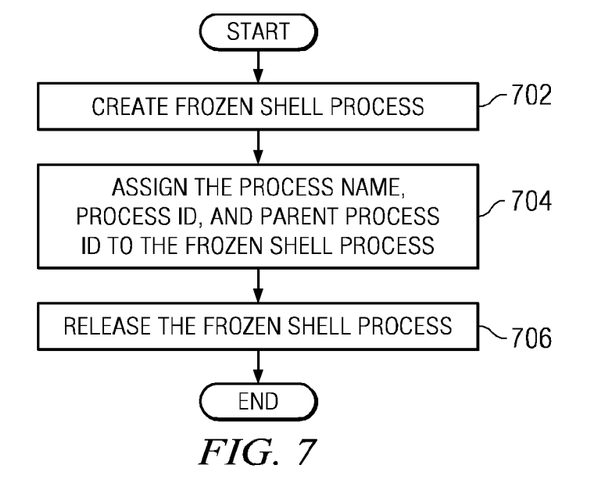
FIG. 7 is a flowchart illustrating a process for restarting a restartable process in accordance with an illustrative embodiment.

Turning now to FIG. 7, a flowchart illustrating a process for restarting a restartable process is shown in accordance with an illustrative embodiment. The process in FIG. 7 is implemented by a software process for managing the checkpoint and restart of processes in a software partitioned environment, such as mobility checkpoint manager 406 in FIG. 4 or mobility checkpoint manager 502 in FIG. 5.

The mobility checkpoint manager creates a frozen process shell representing the process that is being restarted on the arrival server (step 702). The mobility checkpoint manager assigns the process name, process identifier, and parent process identifier to the frozen process shell (step 704). The mobility checkpoint manager then releases the frozen process shell (step 706) with the process terminating thereafter.

Figure 8:
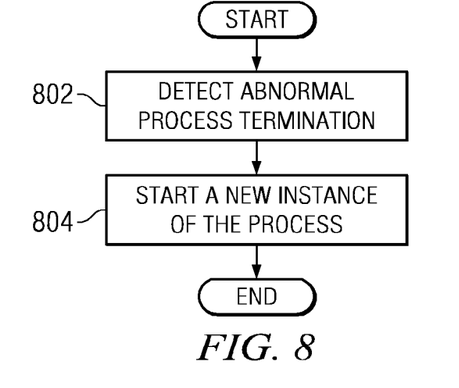
FIG. 8 is a flowchart illustrating a process for a parent process automatically re-spawning the restartable process in accordance with an illustrative embodiment.

FIG. 8 is a flowchart illustrating a process for a parent process automatically re-spawning the restartable process in accordance with an illustrative embodiment. The process in FIG. 8 is implemented by a parent process, such as, without limitation, system resource manager 508 in FIG. 5.

The parent process detects an abnormal process termination of the child process shell, such as, without limitation, exit 506 in FIG. 5 (step 802). The parent process initiates a new instance of the child process (step 804) on the arrival server with the process terminating thereafter.

The illustrative embodiments provide a computer implemented method, apparatus, and computer usable program code for a checkpoint and restart of a process. In one embodiment, a process shell representing a restartable process is created on an arrival server in response to identifying a process on a departure server that is a restartable process. The process shell is frozen. A name of the restartable process, an identifier of the restartable process, and an identifier of a parent process of the restartable process is assigned to the process shell. The process shell is then unfrozen and exits. A parent process restarts the restartable process when the process shell exits.

Thus, the illustrative embodiments permit a checkpoint and restart to restore a system service using a fake process that assumes the same process identifier and parent process identifier as the process that is being restored. The fake process then exits. The parent process sees that the fake child process terminated abnormally and the parent process restarts a new instance of the child process. The new instance of the child process is not a fake process. Rather, the new instance of the child process is equivalent to the original process that was running on the departure server at checkpoint time.

In addition, this process reduces the time and memory required during a checkpoint and restart process because the only data necessary to create the process shell on the arrival server is the original process name, process identifier of the original process, and the parent process identifier for the original process. This represents significantly less data than would be necessary to fully checkpoint all data describing the internal and external state of the process on the departure server and restart the process on the arrival server. This process also allows for greater efficiency and fewer processor resources for checkpoint and restart.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the steps may occur out of the order noted in the figures. For example, two steps shown in succession may, in fact, be executed substantially concurrently, or the steps may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store the program for use by or in connection with the instruction execution system, apparatus, or device.

The medium can be an electronic, magnetic, optical, electromagnetic or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk, millipede storage technology, Magneto-resistive random access memory (MRAM), or phase-change memory, also known as PCM, PRAM, Ovonic Unified Memory, and Chalcogenide RAM (C-RAM). Current examples of optical disks include compact disk - read only memory (CD-ROM), compact disk - read/write (CD- R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for checkpoint and restart of a process, the computer implemented method comprising:
   responsive to identifying a process on a departure server as a restartable process, creating a process shell representing the restartable process on an arrival server, wherein the process shell is frozen;
   assigning a name of the restartable process, an identifier of the restartable process, and an identifier of a parent process of the restartable process to the process shell; and
   releasing the process shell, wherein the process shell exits, and wherein the parent process restarts the restartable process in response to the process shell exiting.

2. The computer implemented method of claim 1 further comprising:
   responsive to detecting an abnormal process termination associated with the process shell by the parent process identified by the identifier of the parent process, reinitializing the restartable process on the arrival server by the parent process.

3. The computer implemented method of claim 1 further comprising:
   responsive to initiating the checkpoint of a plurality of processes on a software partition, identifying a set of restartable processes; and
   saving only a process name, a process identifier and a parent process identifier associated with each restartable process in the set of restartable process to form checkpoint data, wherein other data describing an internal state of each process is unnecessary to restart each restartable process.

4. The computer implemented method of claim 3 further comprising:
   restarting a set of process shells on the arrival server, wherein each process shell in the set of process shells represents a restartable process in the set of restartable processes.

5. The computer implemented method of claim 1 further comprising:
   responsive to receiving a request to checkpoint a software partition on the departure server, identifying a set of restartable processes in the software partition, wherein identifying the restartable processes further comprises:
   querying a registry of restartable processes, wherein the registry of restartable processes comprises a list of all restartable processes executing in the software partition.

6. The computer implemented method of claim 1 further comprising:
   notifying, by the process executing in a software partition on the departure server, a checkpoint manager that the process is a restartable process, wherein the process calls a programming interface to notify the checkpoint manager that the process is the restartable process.

7. The computer implemented method of claim 1 wherein a restartable process is an application service that is restarted automatically by the parent process in response to an abnormal termination of the restartable process.

8. A computer program product comprising:
   a computer usable medium including computer usable program code for checkpoint and restart of a process, said computer program product comprising:
   computer usable program code for creating a process shell representing a restartable process on an arrival server in response to identifying the restartable process on a departure server, wherein the process shell is frozen;
   computer usable program code for assigning a name of the restartable process, an identifier of the restartable process, and an identifier of a parent process of the restartable process to the process shell; and
   computer usable program code for releasing the process shell, wherein the process shell exits, and wherein the parent process restarts the restartable process in response to the process shell exiting.

9. The computer program product of claim 8 further comprising:
computer usable program code for reinitializing the restartable process on the arrival server by the parent process in response to detecting an abnormal process termination associated with the process shell by the parent process.

10. The computer program product of claim 8 further comprising:
computer usable program code for identifying a set of restartable processes in response to initiating the checkpoint of a plurality of processes on a software partition; and
computer usable program code for saving only a process name, a process identifier and a parent process identifier associated with each restartable process in the set of restartable process to form checkpoint data, wherein other data describing an internal state of each process is unnecessary to restart each restartable process.

11. The computer program product of claim 8 further comprising:
computer usable program code for restarting a set of process shells on the arrival server, wherein each process shell in the set of process shells represents a restartable process in a set of restartable processes.

12. The computer program product of claim 8 further comprising:
computer usable program code for identifying a set of restartable processes in a software partition in response to receiving a request to checkpoint the software partition on the departure server, wherein identifying the restartable processes further comprises:
computer usable program code for querying a registry of restartable processes, wherein the registry of restartable processes comprises a list of all restartable processes executing in the software partition.

13. The computer program product of claim 8 further comprising:
computer usable program code for notifying, by the process executing in a software partition on the departure server, a checkpoint manager that the process is a restartable process, wherein the process calls a programming interface to notify the checkpoint manager that the process is the restartable process.

14. The computer program product of claim 8 wherein a restartable process is an application service that is restarted automatically by the parent process in response to an abnormal termination of the restartable process.

15. An apparatus comprising:
a bus system;
a communications system coupled to the bus system;
a memory connected to the bus system, wherein the memory includes computer usable program code; and
a processing unit coupled to the bus system, wherein the processing unit executes the computer usable program code to create a process shell representing a restartable process on an arrival server in response to identifying a process on a departure server as the restartable process, wherein the process shell is frozen; assign a name of the restartable process, an identifier of the restartable process, and an identifier of a parent process of the restartable process to the process shell; and release the process shell, wherein the process shell exits, and wherein the parent process restarts the restartable process in response to the process shell exiting.

16. The apparatus of claim 15 wherein the processing unit further executes the computer usable program code to reinitialize the restartable process on the arrival server by the parent process in response to detecting an abnormal process termination associated with the process shell by the parent process identified by the identifier of the parent process.

17. The apparatus of claim 15 wherein the processing unit further executes the computer usable program code to identify a set of restartable processes; and save only a process name, a process identifier and a parent process identifier associated with each restartable process in the set of restartable processes to form checkpoint data in response to initiating the checkpoint of a plurality of processes on a software partition, wherein other data describing an internal state of each process is unnecessary to restart each restartable process.

18. The apparatus of claim 15 wherein the processing unit further executes the computer usable program code to restart a set of process shells on the arrival server, wherein each process shell in the set of process shells represents a restartable process in a set of restartable processes.

19. The apparatus of claim 15 wherein the processing unit further executes the computer usable program code to identify a set of restartable processes in a software partition in response to receiving a request to checkpoint the software partition on the departure server, wherein the processing unit further executes the computer usable program code to query a registry of restartable processes, and wherein the registry of restartable processes comprises a list of all restartable processes executing in the software partition.

20. The apparatus of claim 15 wherein the processing unit further executes the computer usable program code to notify, by the process executing in a software partition on the departure server, a checkpoint manager that the process is a restartable process, wherein the process calls a programming interface to notify the checkpoint manager that the process is the restartable process.

* * * * *